United States Patent [19]
Shibano

[11] Patent Number: 6,009,910
[45] Date of Patent: Jan. 4, 2000

[54] REFRIGERANT TRANSPORTING HOSE

[75] Inventor: Hiroaki Shibano, Kanagawa, Japan

[73] Assignee: The Yokohama Rubber Co., Ltd., Tokyo, Japan

[21] Appl. No.: 09/106,105

[22] Filed: Jun. 29, 1998

[30] Foreign Application Priority Data

Jun. 30, 1997 [JP] Japan ..................... 9-174076

[51] Int. Cl.[7] .................... F16L 11/00; B29D 22/00
[52] U.S. Cl. ............................ 138/126; 428/36.8
[58] Field of Search .................. 428/36.91, 36.8; 425/52; 138/126

[56] References Cited

U.S. PATENT DOCUMENTS

| | | | |
|---|---|---|---|
| 5,593,701 | 1/1997 | Graves et al. | 425/52 |
| 5,707,701 | 1/1998 | Saitoh et al. | 428/36.91 |
| 5,780,132 | 7/1998 | Saitoh et al. | 428/36.8 |

*Primary Examiner*—Andres Kashnikow
*Assistant Examiner*—Davis Hwu
*Attorney, Agent, or Firm*—Finnegan, Henderson, Farabow, Garrett & Dunner, L.L.P.

[57] ABSTRACT

Refrigerant transporting hose comprising an inner tube formed of a rubber composition based on an isobutylene.p-methylstyrene copolymer in which part or all of the p-methylstyrene units are brominated, and an outer tube around the inner tube with a reinforcing layer interposed, is improved not only in softness and resistance to the permeation of refrigerants but also in vibration and sound absorbing characteristics.

6 Claims, No Drawings

REFRIGERANT TRANSPORTING HOSE

BACKGROUND OF THE INVENTION

1. Field of the Invention

The present invention relates to a refrigerant transporting hose, particularly one that is improved not only in softness and resistance to the permeation of refrigerants but also in vibration and sound absorbing characteristics.

1. Description of the Related Art

A chlorofluorocarbon gas CFC-12 has long been used as a refrigerant in air conditioners on automobiles and so forth but being a causative agent of ozone depletion, CFC-12 was recently singled out as a substance the use of which must be regulated in order to conserve the environment on the earth. Under these circumstances, the use of hydrofluorocarbon HFC-134a as a substitute refrigerant is gaining popularity.

In conventional automotive air conditioners and so forth that use CFC-12 as a refrigerant, hoses made of NBR rubbers have been used to transport and supply the refrigerant to various parts of the machine. Such hoses are useful for transporting CFC-12 as the refrigerant but not suitable for use with HFC-134a on account of its undesirably high permeation. Under these circumstances, the refrigerant HFC-134a is conventionally transported by way of a hose that has a polyamide layer provided as the innermost layer in contact with the refrigerant. Another proposal is the formation of an inner tube from a rubber layer made of a rubber composition based on a butyl or halogenated butyl rubber [Unexamined Published Japanese Patent Application (kokai) No. 140688/1991)].

However, polyamides generally have high Young's moduli and are not satisfactory in softness; hence, if they are used as the constituent material of hoses for supplying refrigerants in automotive air conditioners and so forth, the vibrations and sound generated from the compressor cannot be effectively absorbed but are simply transmitted to other parts or, alternatively, the hose itself will vibrate to upset quietness. On the other hand, the hose of which the inner tube is formed from a rubber layer made of a rubber composition based on a butyl or halogenated butyl rubber does not have satisfactory resistance to the permeation of refrigerant HFC-134a.

SUMMARY OF THE INVENTION

An object, therefore, of the present invention is to provide a refrigerant transporting hose that is improved not only in softness and resistance to the permeation of refrigerants but also in vibration and sound absorbing characteristics.

This object of the invention can be attained by a refrigerant transporting hose that comprises an inner tube and an outer tube around it with a reinforcing layer interposed, which is characterized in that the inner tube is formed of a rubber composition based on an isobutylene. p-methylstyrene copolymer in which part or all of the p-methylstyrene units are brominated.

DETAILED DESCRIPTION OF THE INVENTION

The refrigerant transporting hose of the present invention (which is hereinafter referred to simply as the "hose of the invention") will now be described below in detail.

The hose of the invention comprises at least three layers, an inner tube to have contact with refrigerant HFC-134a flowing through the hose, a reinforcing layer around the inner tube, and an outer tube which in turn is provided around the reinforcing layer. The hose of the invention may optionally have another layer in addition to the inner tube, the reinforcing layer and the outer tube. Each of the inner tube, the reinforcing layer and the outer tube may be composed of one or more sublayers. For instance, the inner tube may consist of two or more sublayers, or the reinforcing layer may consist of two or more sublayers, with an intermediate rubber layer provided between adjacent sublayers, or the outer tube may consist of two or more sublayers.

The hose of the invention is such that the inner tube is formed of a rubber composition based on an isobutylene. p-methylstyrene copolymer in which part or all of the p-methylstyrene units are brominated. In the case where the inner tube consists of two or more layers, the innermost layer to have contact with the refrigerant must be formed of the stated rubber composition.

The isobutylene. p-methylstyrene copolymer which is the main component of the rubber composition for forming the inner tube (the copolymer is hereinafter referred to as the "modified brominated copolymer rubber") has part or all of the p-methylstyrene units brominated.

The modified brominated copolymer rubber is comprised of a copolymer having a recurring unit structure (A) that is derived from isobutylene and represented by the formula (a) set forth below (which is hereinafter referred to simply as the "isobutylene unit"), a recurring unit structure (B) that is derived from p-methylstyrene and represented by the formula (b) also set forth below (which is hereinafter referred to simply as the "p-methylstyrene unit") and a recurring unit structure (C) that has the brominated methyl group in the p-methylstyrene unit and which is represented by the formula (c) also set forth below (which is hereinafter referred to simply as the "p-brominated methylstyrene unit"); this rubber is obtained by brominating part or all of the methyl groups in the p-methylstyrene units in the isobutylene. p-methylstyrene copolymer.

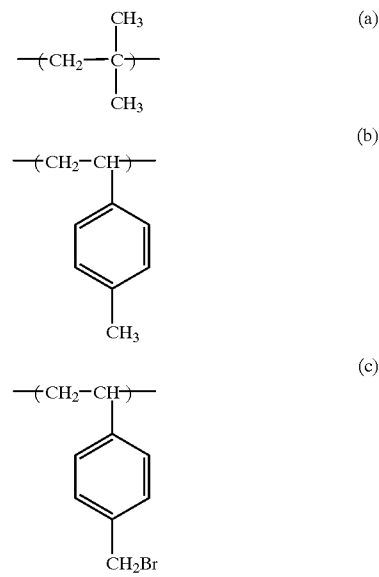

The content of isobutylene units in the modified brominated copolymer rubber is preferably in the range of 73–96 wt %, more preferably in the range of 85–93 wt %.

The content of p-methylstyrene units in the modified brominated copolymer rubber is preferably in the range of 3–20 wt %, more preferably in the range of 5–10 wt %. If the content of p-methylstyrene units is less than 3 wt %, the resulting rubber composition has only insufficient ozone resistance; beyond 20 wt %, the cold temperature resistance of the resulting rubber composition will deteriorate so markedly that it is unsuitable for use in making refrigerant transporting hoses.

The content of p-brominated methylstyrene units is preferably in the range of 1.2–7.4 wt %, more preferably in the range of 2.4–4.9 wt %.

The bromine content of the modified brominated copolymer rubber is preferably in the range of 0.5–3.0 wt %, more preferably in the range of 1.0–2.0 wt %. If the bromine content is less than 0.5 wt %, the rubber will vulcanize only slowly and, in addition, it will undergo increased permeation of the refrigerant, which makes it unsuitable for use in making refrigerant transporting hoses. If the bromine content exceeds 3.0 wt %, the vulcanization speed becomes difficult to control and, hence, subsequent processing into a hose will involve considerable difficulty.

A specific example of the modified brominated copolymer rubber is commercially available from EXXON CHEMICAL under the trade name EXXPRO MDX.

The rubber composition for forming either the inner tube of the hose of the invention or its innermost layer to have contact with the refrigerant when it is composed of two or more layers contains the modified brominated copolymer rubber as the main rubber component. The rubber composition may optionally contain other rubber components to the extent that is not detrimental to the object of the present invention. Examples of such optional rubber components include butyl rubbers and an ethylene-propylene copolymer rubber. If such optional rubber components are to be contained, their content is typically not more than about 50 PHR, preferably not more than about 20 PHR.

Besides the main and optional rubber components described above, the rubber composition under discussion contains a vulcanization agent for vulcanizing those rubber components during formation of the inner tube. The vulcanization agent to be incorporated is not limited to any particular type insofar as it is selected from among those which are customarily used as vulcanization agents for butyl rubbers; examples include sulfur, quinone dioxide, vulcanizing resins (modified alkylphenolic resins), zinc oxide, zinc oxide/stearic acid, metal salts of stearic acid such as zinc stearate, zinc salts of dithiocarbamates and so forth, as well as the combination of thiuram and thiazole. The amount of the vulcanization agent to be incorporated is not limited to any particular value and may be selected from the appropriate range.

The rubber composition under discussion may also contain various auxiliary materials that are customarily used in the rubber industry, as exemplified by fillers, reinforcing agents, plasticizers, antioxidants, processing aids, pigments and so forth.

The inner tube of the hose of the invention which is comprised of the rubber composition described above may have any wall thickness that is customary for conventional refrigerant transporting hoses; it is generally in the range of 1.0–3.5 mm, preferably in the range of 1.5–2.5 mm.

The reinforcing layer to be formed around the inner tube of the hose of the invention may be formed of reinforcement fibers that are customarily used in the reinforcing layer of hoses of the type contemplated by the present invention. For instance, the reinforcing layer may be formed by braiding reinforcement fibers such as rayon, polyester, polyamide and polyvinyl alcohol fibers. The thickness of the reinforcing layer is not limited to any particular value insofar as it is within the customary range for hoses of the type contemplated by the present invention.

The outer tube of the hose of the invention may be formed of the vulcanizate of any rubber composition insofar as it can be vulcanized under the same conditions as the inner tube forming rubber composition already described above. For instance, the outer tube may be composed of the vulcanizate of a rubber composition containing a butyl rubber (e.g. NBR or halogenated butyl rubber), an ethylene-propylene copolymer rubber (e.g. EPR or EPDM) or a chloroprene rubber (CR) or SBR as the rubber component. A rubber composition that contains an ethylene-propylene copolymer rubber or a halogenated butvl rubber as the rubber component is particularly preferred since it contributes to an improvement in the ability of the hose to resist water permeation. The thickness of the outer tube in the hose of the invention is not limited to any particular value insofar as it is within the customary range for hoses of the type contemplated by the present invention.

The manufacture of the hose of the invention is not limited in any particular way and can be accomplished in the usual manner. For example, the inner tube forming rubber composition is extruded from an extruding machine to form a rubber layer (i.e., inner tube) around a mandrel preliminarily coated with a release agent. The rubber layer is overlaid with the reinforcing layer which is formed by braiding appropriate reinforcing fibers with a braiding machine. A rubber layer is also formed around the reinforcing layer by extruding the outer tube forming rubber composition. Thereafter, vulcanization is effected at superatmospheric pressure within a temperature range of 130–170° C., typically 140–160° C. Following subsequent cooling, the mandrel pulled out, leaving the hose of the invention behind.

SPECIFIC EXAMPLES OF THE INVENTION

The following working and comparative examples are provided for the purpose of further illustrating the present invention but are in no way to be taken as limiting and various modifications can be made without departing from the spirit and scope of the invention.

Example 1

An extruding machine was supplied with the ingredients set forth below in the amounts also indicated below. The rubber composition was then heated at 90–110° C. and extruded around a mandrel of 14 mm$\phi$ to form a rubber layer (1) in a wall thickness of 2.2 mm which was sufficient to serve as the inner tube.

| Rubber Composition for the Inner tube | Parts by weight |
|---|---|
| Modified brominated copolymer rubber*[1] | 100 |
| [ Isobutylene unit | 87.6wt% ] |
| [ p-Methylstyrene unit | 7.5wt% ] |
| [ Brominated p-methylstyrene unit | 4.9wt% ] |
| Carbon black of HAF Class*[2] | 60 |
| Softening agent*[3] | 10 |
| Zinc oxide | 2 |
| Stearic acid | 1 |
| Zinc stearate | 1 |

Notes:
*[1]EXXPRO MDX90-10 manufactured by EXXON CHEMICAL
*[2]SHEAST N manufactured by TOKAI CARBON CO., LTD.
*[3]Machine oil 22 manufactured by SHOWA SHELL SEKIYU K.K.

The rubber layer (1) was overlaid with a reinforcing layer 1.0 mm thick that was made of a braided polyester fiber reinforcement.

A rubber composition that would give the characteristics shown in Table 1 (see below) was extruded over the reinforcing layer from an extruding machine so as to form a rubber layer in a thickness of 1.2 mm that was sufficient to serve as the outer tube.

In the next step, a lead coating was applied onto the outer tube forming rubber layer by means of a leading machine and steam vulcanization was performed at 154° C. for 60 min. Thereafter, the lead coating was removed by means of a lead stripping machine and the mandrel was pulled out to leave a hose of a three-layer structure behind.

The hose was measured for the permeation of HFC-134a and the bending force by the methods described below. The results of the measurements are shown in Table 1.

Permeation of HFC-134a

Four hoses exposed along a length of 0.5 m were used as samples. Three of them were filled with a refrigerant (HFC-134a) in a volume of 0.7±0.1 g per cubic centimeter of the inner capacity of the hose. The other sample was stoppered with no refrigerant contained. The four samples were left in a thermostatic chamber (80±2° C.) for 30 min and each hose was measured for its weight and the length of its exposed portion. Thereafter, the samples were held in a thermostatic chamber (80±20° C.) for 96 h, during which weight measurements were conducted at 24 h intervals. After the lapse of 96 h, check was made to ensure that the saturated vapor pressure was retained in each of the refrigerant-filled hose samples at the test temperature. The amount of refrigerant permeation was determined by the following equation (1) as the weight loss for 24–96 h excepting the change in the weight of the hose itself:

$$A=[(B/S1)-(C/S2)]\times 100 \qquad (1)$$

where A: the amount (g/m/72 h) of refrigerant permeation

B: the weight loss (g) of the refrigerant-filled hose for 24–96 h

C: the weight loss (g) of the refrigerant-free hose for 24–96 h

S1: the length (m) of the exposed portion of the refrigerant-filled hose

S2: the length (m) of the exposed portion of the refrigerant-free hose.

Bending Force

The hose was bent by 180° in an arc of a circle having a radius three times as large as the outside diameter of the hose and the required bending force was measured.

Comparative Example 1

A hose was constructed as in Example 1, except that an inner tube having a wall thickness of 2.5 mm was formed of NBR in place of the modified brominated copolymer rubber and that an outer tube having a wall thickness of 1.2 mm was formed of a chloroprene rubber (CR). The thus produced hose was measured for the permeation of HFC-134a and the bending force by the same methods as used in Example 1. The results of the measurements are shown in Table 1.

Comparative Examole 2

A polyamide resin was extruded from an extruding machine to form the innermost layer in a thickness of 0.15 mm around a mandrel of 14 mmφ. Then, a rubber compoosition that would give the characteristics shown in Table 1 was extruded over the innermost layer from an extruding machine to form a rubber layer in a thickness of 2.0 mm which was sufficient to serve as the inner tube.

In the next step, the rubber layer forming the inner tube was overlaid with a reinforcing layer 1.0 mm thick that was made of a braided polyester fiber reinforcement.

Subsequently, a rubber composition that would give the characteristics shown in Table 1 was extruded over the reinforcing layer from an extruding machine so as to form a rubber layer in a thickness of 1.2 mm that was sufficient to serve as the outer tube.

In the next step, a lead coating was applied onto the outer tube forming rubber layer by means of a leading machine and steam vulcanization was performed at 154° C. for 60 min. Thereafter, the lead coating was removed by means of a lead stripping machine and the mandrel was pulled out to leave a hose of a three-layer structure behind.

The hose was measured for the permeation of HFC-134a and the bending force by the same methods as used in Example 1. The results of the measurements are shown in

TABLE 1

|  | Example 1 | Comparative Example 1 | Comparative Example 2 |
|---|---|---|---|
| HFC-134a permeation, g/72 h/m | 4 | 30 | 2.5 |
| Bending force, N | 10 | 10 | 17 |

The refrigerant transporting hose of the present invention is improved not only in softness and resistance to the permeation of HFC-134a as a refrigerant but also in vibration and sound absorbing characteristics. Because of these advantages, the hose of the invention may be used to supply HFC-134a in an automotive air conditioner and yet it exhibits high resistance to the permeation of refrigerant HFC-134a while absorbing the vibration and sound from the compressor of the air conditioner by sufficient amounts to ensure greater quietness in the automobile.

I claim:

1. A refrigerant transporting hose comprising an inner tube and an outer tube around it with a reinforcing layer interposed, said inner tube being formed of a rubber composition based on an isobutylene.p-methylstyrene copolymer in which part or all of the p-methylstyrene units are brominated, wherein said isobutylene.p-methylstyrene copolymer is comprised of a copolymer having a recurring unit structure (A) that is derived from isobutylene and represented by the formula (a) set forth below, a recurring unit structure (B) that is derived from p-methylstyrene and represented by the formula (b) set forth below, and a recurring unit structure (C) that has the methyl group in the recurring unit (B) brominated and which is represented by the formula (c) set forth below:

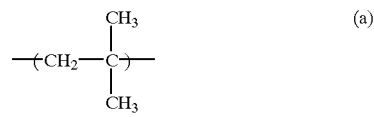

(a)

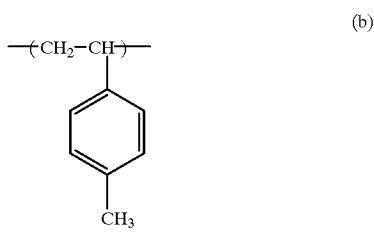

(b)

-continued

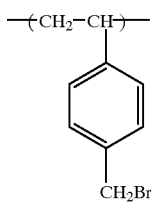
(c)

2. The refrigerant transporting hose according to claim 1, wherein said outer tube is made of an ethylene.propylene copolymer rubber or a halogenated butyl rubber.

3. The refrigerant transporting hose according to claim 1, wherein the content of the recurring unit structure (A) in said isobutylene.p-methylstyrene copolymer is 73–96 wt %.

4. The refrigerant transporting hose according to claim 1, wherein the content of the recurring unit structure (B) in said isobutylene.p-methylstyrene copolymer is 3–20 wt %.

5. The refrigerant transporting hose according to claim 1, wherein the content of the recurring unit structure (C) in said isobutylene.p-methylstyrene copolymer is 1.2–7.4 wt %.

6. The refrigerant transporting hose according to claim 1, wherein the bromine content of said isobutylene.p-methylstyrene copolymer is 0.5–3.0 wt %.

* * * * *